United States Patent
Jin et al.

(10) Patent No.: US 10,650,231 B2
(45) Date of Patent: May 12, 2020

(54) METHOD, DEVICE AND SERVER FOR RECOGNIZING CHARACTERS OF CLAIM DOCUMENT, AND STORAGE MEDIUM

(71) Applicant: PING AN TECHNOLOGY (SHENZHEN) CO., LTD., Shenzhen (CN)

(72) Inventors: Feihu Jin, Shenzhen (CN); Yan Xue, Shenzhen (CN); Yi Mi, Shenzhen (CN); Huanhuan Li, Shenzhen (CN); Yi Qiu, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 80 days.

(21) Appl. No.: 16/084,244

(22) PCT Filed: Jun. 30, 2017

(86) PCT No.: PCT/CN2017/091363
§ 371 (c)(1),
(2) Date: Sep. 12, 2018

(87) PCT Pub. No.: WO2018/188199
PCT Pub. Date: Oct. 18, 2018

(65) Prior Publication Data
US 2019/0147239 A1 May 16, 2019

(30) Foreign Application Priority Data
Apr. 11, 2017 (CN) .......................... 2017 1 0233613

(51) Int. Cl.
*G06K 9/00* (2006.01)
*G06K 9/62* (2006.01)
(Continued)

(52) U.S. Cl.
CPC ..... *G06K 9/00463* (2013.01); *G06K 9/00456* (2013.01); *G06K 9/036* (2013.01);
(Continued)

(58) Field of Classification Search
CPC .. G06K 9/036; G06K 9/6271; G06K 9/00456; G06K 9/4628; G06K 9/00463; G06K 2209/01; G06N 5/046; G06Q 40/08
See application file for complete search history.

(56) References Cited

U.S. PATENT DOCUMENTS

2012/0075648 A1* 3/2012 Keys .................. G06K 9/00979
358/1.11
2014/0085669 A1 3/2014 Kashimoto et al.
(Continued)

FOREIGN PATENT DOCUMENTS

CN 102567764 A 7/2012
CN 103258198 A 8/2013
(Continued)

OTHER PUBLICATIONS

Search Report of European Patent Application No. 17899230.1 dated May 21, 2019.
(Continued)

*Primary Examiner* — Syed Haider

(57) ABSTRACT

The disclosure discloses a method, device and server of recognizing characters of a claim document, and a storage medium. The method includes: after the server receives a claim document image to be subjected to character recognition, performing region segmentation according to the frame line layout of a claim document frame format, thus obtaining one or multiple segmented regions; and calling a predetermined analysis model to analyze all the obtained segmented regions, and respectively performing character recognition on all the analyzed segmented regions by using (Continued)

a predetermined recognition rule to recognize characters in all the segmented regions.

9 Claims, 4 Drawing Sheets

(51) Int. Cl.
*G06K 9/46* (2006.01)
*G06K 9/03* (2006.01)
*G06N 5/04* (2006.01)
*G06Q 40/08* (2012.01)

(52) U.S. Cl.
CPC ......... *G06K 9/4628* (2013.01); *G06K 9/6271* (2013.01); *G06N 5/046* (2013.01); *G06K 2209/01* (2013.01); *G06Q 40/08* (2013.01)

(56) References Cited

U.S. PATENT DOCUMENTS

| | | | |
|---|---|---|---|
| 2017/0004359 A1* | 1/2017 | Venkatachalam | G06F 40/174 |
| 2018/0101726 A1* | 4/2018 | Wang | G06K 9/00463 |
| 2018/0232884 A1* | 8/2018 | Hayashi | G06K 9/00456 |

FOREIGN PATENT DOCUMENTS

| | | |
|---|---|---|
| CN | 105359530 A | 2/2016 |
| CN | 105654072 A | 6/2016 |
| CN | 106446881 A | 2/2017 |
| CN | 106557747 A | 4/2017 |
| JP | H04304586 A | 10/1992 |
| JP | 2003256772 A | 9/2003 |
| JP | 2010061693 A | 3/2010 |
| TW | 200802137 A | 4/2009 |
| TW | 200945893 A | 11/2009 |

OTHER PUBLICATIONS

Li Pengchao et al., Rejecting Character Recognition Errors Using CNN Based Confidence Estimation, Chinese Journal of Electronics, May 2016, vol. 25, No. 3, pp. 520-526.

Thomas M Breuel, Benchmarking of LSTM Networks, Aug. 11, 2015.

Yousefi Mohammad Reza et al., Binarization-free OCR for Historical Documents Using LSTM Networks, 13th International Conference on Document Analysis and Recognition (ICDAR), Aug. 23, 2015, pp. 1121-1125.

* cited by examiner

METHOD, DEVICE AND SERVER FOR RECOGNIZING CHARACTERS OF CLAIM DOCUMENT, AND STORAGE MEDIUM

CROSS REFERENCE TO RELATED APPLICATIONS

This application is the national phase entry of International Application No. PCT/CN2017/091363, filed on Jun. 30, 2017, which is based upon This application is based on and claims priority to China Patent Application No. CN2017102336133, filed on Apr. 11, 2017 and entitled "Method and Server of Recognizing Characters of Claim Document", which are hereby incorporated by reference in its entirety.

TECHNICAL FIELD

This disclosure relates to the technical field of computers, and more particularly relates to a method, device and server for recognizing characters of a claim document, and a computer readable storage medium.

BACKGROUND

With increasing of the insurance awareness of the public, the number of customers purchasing insurance is substantially increased. As a result, an insurance company will handle with more and more customer claim applications, and operators in the insurance company need to type in more and more claim document images, thus causing the shortage of operators for typing in documents, and often causing document recording mistakes. To effectively reduce the document recording mistakes and improve the document recording efficiency, at the present, some insurance companies introduce an OCR (Optical Character Recognition) technology during document recording to automatically recognize characters of a claim document image so as to fill corresponding input fields with the characters.

However, an existing solution for recognizing the characters of the claim document image by using the OCR technology only makes use of its own recognition engine to uniformly recognize the characters in the whole claim document image without considering the influence of a claim document frame format on the recognition precision and the interference with character recognition by frame lines in a document, so that the existing recognition solution is low in recognition precision, and a lot of human and material resources are needed for verification.

SUMMARY

The disclosure mainly aims at providing a method, device and server of recognizing characters of a claim document, and a computer readable storage medium, and is designed to improve the recognition precision of the claim document.

To achieve the above-mentioned objective, a method of recognizing characters of a claim document is provided according to a first aspect of the disclosure, the method including:

after a server receives a claim document image to be subjected to character recognition, performing region segmentation according to the frame line layout of a claim document frame format, thus obtaining one or multiple segmented regions;

calling a predetermined analysis model to analyze all the obtained segmented regions, and respectively performing character recognition on all the analyzed segmented regions by using a predetermined recognition rule to recognize characters in all the segmented regions.

A device of recognizing characters of a claim document is provided according to a second aspect of the disclosure, the device including:

a segmentation module, which is used for performing region segmentation according to the frame line layout of a claim document frame format after receiving a claim document image to be subjected to character recognition, thus obtaining one or multiple segmented regions;

a recognition module, which is used for calling a predetermined analysis model to analyze all the obtained segmented regions, and respectively performing character recognition on all the analyzed segmented regions by using a predetermined recognition rule to recognize characters in all the segmented regions.

A server of recognizing characters of a claim document is provided according to a third aspect of the disclosure, the server including: a memory and a processor. The memory stores a program of recognizing the characters of the claim document. The program of recognizing the characters of the claim document is executed by the processor to realize the following steps:

after the server receives a claim document image to be subjected to character recognition, performing region segmentation according to the frame line layout of a claim document frame format, thus obtaining one or multiple segmented regions;

calling a predetermined analysis model to analyze all the obtained segmented regions, and respectively performing character recognition on all the analyzed segmented regions by using a predetermined recognition rule to recognize characters in all the segmented regions.

A computer readable storage medium is provided according to a fourth aspect of the disclosure. The computer readable storage medium stores a program of recognizing the characters of the claim document. The program of recognizing the characters of the claim document is executed by at least one processor to realize the following steps:

after a server receives a claim document image to be subjected to character recognition, performing region segmentation according to the frame line layout of a claim document frame format, thus obtaining one or multiple segmented regions;

calling a predetermined analysis model to analyze all the obtained segmented regions, and respectively performing character recognition on all the analyzed segmented regions by using a predetermined recognition rule to recognize characters in all the segmented regions.

Compared with the prior art, the method, device and server of recognizing the characters of the claim document, and the computer readable storage medium, which are provided by the disclosure, have the advantages that before the character recognition of the claim document image, the claim document image is subjected to region segmentation according to the frame line layout of the claim document frame format, and then the character recognition is performed on all the segmented regions of the claim document respectively by using the predetermined recognition rule so as to respectively recognize the characters in all the segmented regions. In consideration of the influence of the claim document frame format on the recognition precision, the region segmentation is firstly performed according to the frame line layout of the claim document frame format before the character recognition, and then the character recognition is performed on all the segmented regions, so that the influence and the interference of frame lines in the document on the character recognition during uniform recognition of the characters in the whole claim document image are avoided, and the recognition precision for the characters in the claim document can be effectively improved.

Achieving of objectives, functional features, and advantages of this disclosure will be described in further detail with reference to the accompanying drawings.

DETAILED DESCRIPTION

For the purpose of making technical problems to be solved, technical solutions and beneficial effects of the disclosure clearer and more understandable, a further detailed description will be made below to the disclosure in combination with accompanying drawings and embodiments. It should be understood that the specific embodiments described herein are merely explanatory of the disclosure, but not intended to limit the disclosure.

A method of recognizing characters of a claim document is provided.

Figure 1:
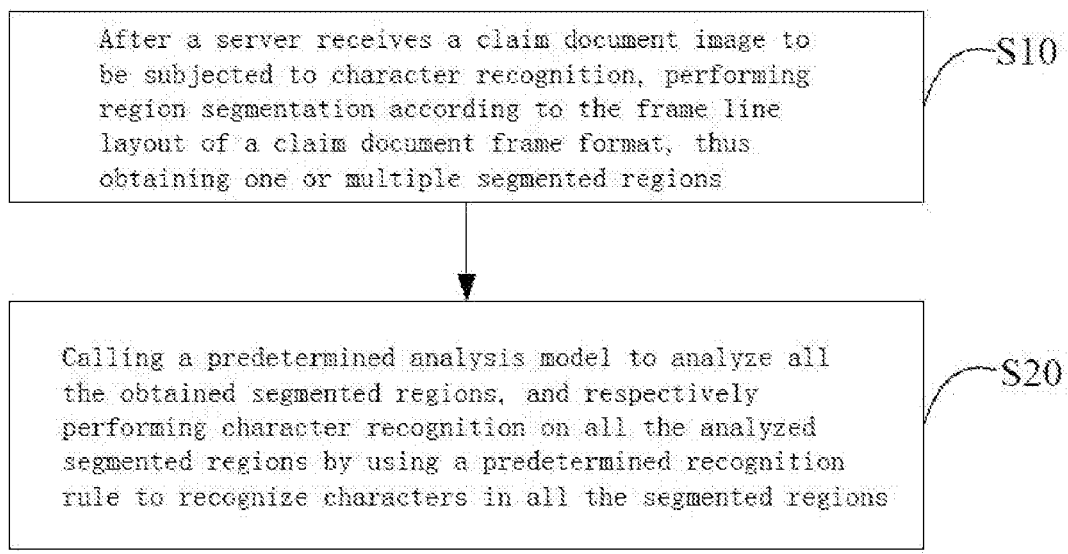
FIG. 1 is a flowchart of a first embodiment of a method of recognizing characters of a claim document of the disclosure.

With reference to FIG. 1, it is a flowchart of a first embodiment of a method of recognizing characters of a claim document.

In the first embodiment, the method of recognizing the characters of the claim document includes:

Step S10, after a server receives a claim document image to be subjected to character recognition, region segmentation is performed according to the frame line layout of a claim document frame format, thus obtaining one or multiple segmented regions;

in this embodiment, the server may receive a character recognition request which is sent by a user and includes the claim document image to be subjected to character recognition. For example, it may receive the character recognition request sent by the user through a terminal such as a mobile phone, a flat computer and a self-service terminal. For example, it may receive the character recognition request sent by the user from a client pre-installed in the terminal such as the mobile phone, the flat computer and the self-service terminal, or receive the character recognition request sent by the user from a browser system in the terminal such as the mobile phone, the flat computer and the self-service terminal.

After the server receives the claim document image to be subjected to character recognition, the region segmentation is performed according to the frame line layout of the claim document frame format. In the claim document image, transverse or vertical frame lines are arrayed according to its frame format so as to form various input fields that the user can fill in relevant information. In this embodiment, the region segmentation is performed according to the frame line layout of the claim document frame format, so that one or more multiple segmented regions are obtained. For example, in one implementation mode, as different types of insurances generally correspond to different document format templates, a corresponding document template may be pre-obtained according to a document type (it is possible that different insurances have different document formats) uploaded by the user, and then the segmentation is performed according to the format of the template. Therefore, a document template corresponding to the claim document image may be found according to the document type of the received claim document image to be subjected to character recognition, and then the region segmentation is performed according to the corresponding document template. The segmented regions are regions having minimum areas, which are surrounded by the frame lines of the claim document frame format and do not include the frame lines, to avoid the interference and the influence of the frame lines on the recognition precision during subsequent character recognition of each segmented region. Each segmented region is similar to each square of an excel sheet, and each square of the excel sheet is the minimum region which does not include the frame lines.

Step S20, a predetermined analysis model is called to analyze all the obtained segmented regions, and character recognition is performed on all the analyzed segmented regions respectively by using a predetermined recognition rule to recognize the characters in all the segmented regions.

After one or multiple segmented regions are obtained by performing the region segmentation on the claim document image according to the frame line layout of the claim document frame format, the predetermined analysis model is called to analyze all the obtained segmented regions, and the character recognition is performed on all the segmented regions respectively by using the predetermined recognition rule to recognize the characters in all the segmented regions, namely the characters in the claim document image. For example, the predetermined analysis model may be used for analyzing recognition models or recognition methods applicable to all the segmented regions, and then the character recognition is performed on all the segmented regions by using the recognition models or the recognition methods applicable to all the segmented regions according to analysis results so as to improve the accuracy of the character recognition. For different segmented regions, it can be analyzed that a character recognition method is to perform the recognition by using an optical character recognition engine, and also by using other recognition engines or trained recognition models, and there is no limitation. After being recognized, the characters in all the segmented regions also may be automatically filled or typed into the corresponding input fields of an electronic claim document corresponding to the claim document image.

In this embodiment, before the character recognition for the claim document image, the claim document image is subjected to region segmentation according to the frame line layout of the claim document frame format, and then the character recognition is performed on all the segmented regions of the claim document respectively by using the predetermined recognition rule so as to respectively recognize the characters in all the segmented regions. In consideration of the influence of the claim document frame format on the recognition precision, the region segmentation is firstly performed according to the frame line layout of the claim document frame format before the character recognition, and then the character recognition is performed on all the segmented regions, so that the influence and the interference of the frame lines in the document on the character recognition during uniform recognition of the characters in the whole claim document image are avoided, and the recognition precision for the characters in the claim document can be effectively improved.

Figure 2:
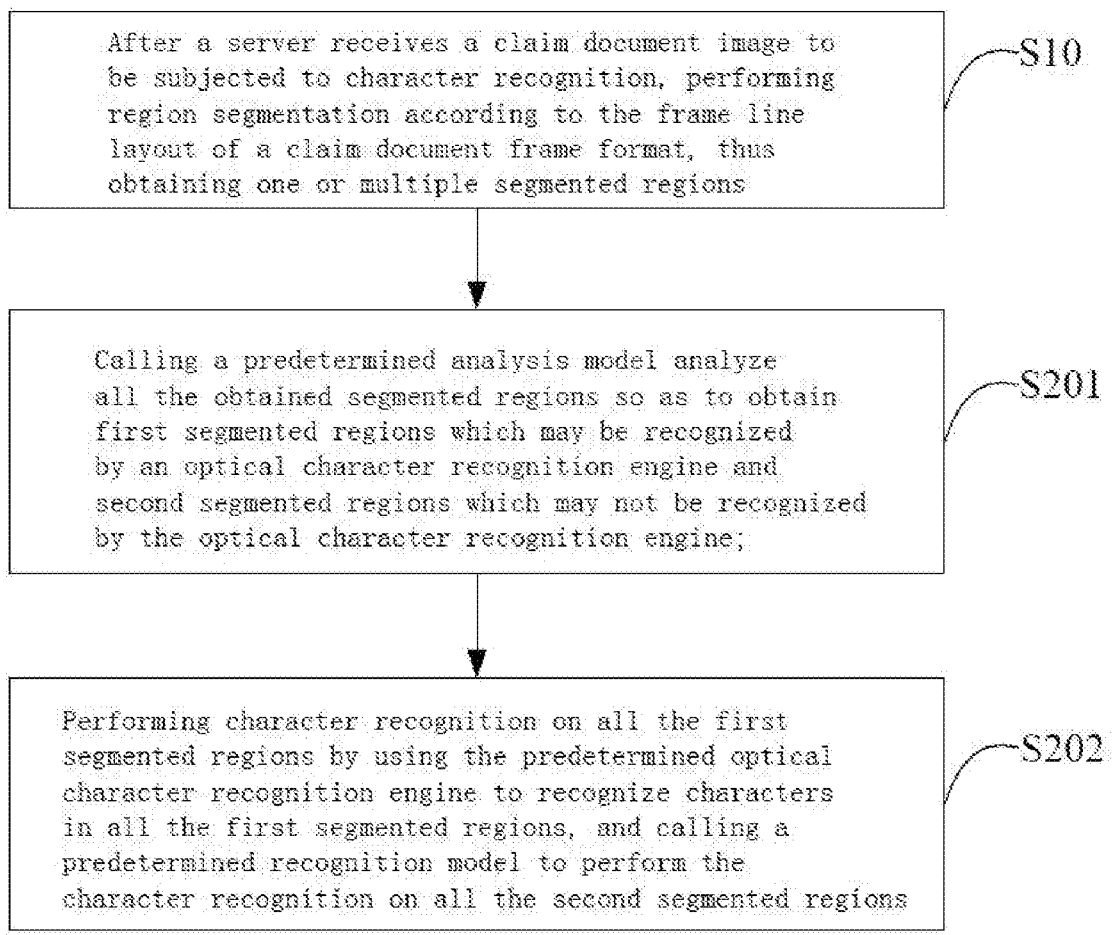
FIG. 2 is a flowchart of a second embodiment of a method of recognizing characters of a claim document of the disclosure.

As shown in FIG. 2, a second embodiment of the disclosure provides a method of recognizing characters of a claim document. On the basis of the above-mentioned embodiment, the step S20 includes:

Step S201, a predetermined analysis model is called to analyze all the obtained segmented regions so as to obtain first segmented regions which may be recognized by an optical character recognition engine and second segmented regions which may not be recognized by the optical character recognition engine;

Step S202, character recognition is performed on all the first segmented regions by using the predetermined optical character recognition engine to recognize characters in all the first segmented regions, and a predetermined recognition model is called to perform the character recognition on all the second segmented regions to recognize characters in all the second segmented regions.

In this embodiment, after one or multiple segmented regions are obtained by performing the region segmentation according to the frame line layout of the claim document frame format, before the obtained segmented regions are recognized, the predetermined analysis model is further called to analyze all the obtained segmented regions so as to obtain the first segmented regions which need no deep recognition and the second segmented regions which need the deep recognition. For example, a description will be made by taking a current own recognition engine which is an OCR (Optical Character Recognition) engine as an example. Regions which may be correctly recognized by the OCR engine or are high in recognition rate are used as the regions which need no deep recognition, that is to say, the current own OCR engine may correctly recognize characters in these regions without the assistance of other recognition methods. Regions which may not be recognized by the OCR engine or are low in recognition rate are used as the regions which need the deep recognition, that is to say, the current own OCR engine may not correctly recognize the characters in these regions, and the character recognition is performed by means of other recognition methods such as a trained recognition model.

After the first segmented regions which may be correctly recognized by the OCR engine and the second segmented regions which may not be recognized by the OCR engine in the claim document image are obtained by analysis, the character recognition may be performed on the first segmented regions and the second segmented regions which are obtained by analysis by taking different recognition methods. The character recognition is performed on all the first segmented regions by using the predetermined OCR engine so as to correctly recognize the characters in all the first segmented regions. The character recognition is performed on all the second segmented regions by calling the predetermined recognition model so as to correctly recognize the characters in all the second segmented regions. The predetermined recognition model may be a recognition model trained for a large number of segmented region samples, and also may be a recognition engine which is more complicated and has a better recognition effect than the recognition method of the own OCR engine, and there is no limitation.

Further, in other embodiments, the predetermined analysis model is a CNN (Convolutional Neural Network) model, and its training process is as follows:

A. for a predetermined claim document frame format, a preset number (for example, 500,000) of claim document image samples based on the claim document frame format are obtained;

B. region segmentation is performed on each claim document image sample according to the frame line layout of the claim document frame format, and third segmented regions misrecognized by the OCR engine and fourth segmented regions correctly recognized by the OCR engine in all the claim document image samples are determined;

C. all the third segmented regions are classified into a first training set, and all the fourth segmented regions are classified into a second training set;

D. a first preset ratio (for example, 80 percent) of segmented regions are extracted from the first training set and the second training set respectively as segmented regions for training, and the residual segmented regions in the first training set and the second training set are used as segmented regions for verification;

E. model training is performed by using all the extracted segmented regions for training so as to generate the predetermined analysis model, and the generated predetermined analysis model is verified by using all the segmented regions for verification;

F. if the verification pass rate is greater than or equal to a preset threshold value (for example, 98 percent), the training is completed, or if the verification pass rate is less than the preset threshold value, the number of claim document image samples is increased, and the steps A, B, C, D and E are repeatedly executed till the verification pass rate is greater than or equal to the preset threshold value.

In this embodiment, the segmented regions are analyzed by using the CNN model trained by a large number of claim document image samples, so that the first segmented regions which may be correctly recognized by the OCR engine and the second segmented regions which may not be correctly recognized by the OCR engine in all the segmented regions of the claim document may be accurately obtained by the analysis, and the subsequent accurate character recognition operation may be performed on the first segmented regions and the second segmented regions by respectively adopting different recognition methods, thereby improving the recognition precision for the characters in the claim document.

Further, in other embodiments, the predetermined recognition model is an LSTM (Long Short-Term Memory) model, and its training process is as follows:

a preset number (for example, 100,000) of region samples are obtained, which may be segmented region samples obtained by performing the region segmentation on a plurality of claim documents based on the frame line layouts of their frame formats in historical data. In one implementation mode, the typefaces in the segmented region samples may be uniformly set into black, and the backgrounds are set into white, thus facilitating the character recognition. All the segmented region samples are labeled, for example, each segmented region sample may be named by characters included in this segmented region sample so as to facilitate the labeling.

The preset number of segmented region samples are classified into a first data set and a second data set according to a preset ratio (for example, 8:2), the first data set is used as a training set, and the second data set is used as a test set, wherein the sample number ratio of the first data set is greater than or equal to that of the second data set.

The first data set is sent into an LSTM network for model training, and the model is tested by using the second data set every preset time (for example, every 30 minutes or every 1,000 iterations) so as to estimate the effect of the current trained model. For example, during test, the character recognition may be performed on the segmented region samples in the second data set by using the trained model, and character recognition results of the segmented region samples are compared with the labels of these segmented region samples by using the trained model so as to calculate errors between the character recognition results of the trained model and the labels of the segmented region samples. To be specific, during calculation of the errors, an edit distance may be used as a calculation standard, wherein the edit distance is also called a Levenshtein distance which indicates the smallest number of times of edit operation required by conversion from one character string into another character string. An allowable edit operation includes replacing one character by another character, inserting one character and deleting one character. Generally, if the edit distance is shorter, two strings are more similar. Therefore, when the edit distance is used as the calculation standard to calculate the errors between the character recognition results of the trained model and the labels of the segmented region samples, if the calculated errors are smaller, the character recognition results of the trained model are more similar to the labels of the segmented region samples; and on the contrary, if the calculated errors are larger, the character recognition results of the trained model are less similar to the labels of the segmented region samples.

As the labels of the segmented region samples are the names of these segmented region samples, namely the characters included in these segmented region samples, the calculated errors between the character recognition results of the trained model and the labels of the segmented region samples are errors between the character recognition results of the trained model and the characters included in the segmented region samples, and may reflect errors between characters recognized by the trained model and correct characters. The errors obtained by each test on the trained model by using the second data set are recorded, and the change tendency of the errors is analyzed. If it analyzes that the errors of the character recognition of the segmented region samples by the trained model in the test are diverged, training parameters such as an activation function, the number of LSTM layers and input and output variable dimensions are adjusted, and then the model is retrained, so that the errors of the character recognition of the segmented region samples by the trained model in the test may be converged. After it analyzes that the errors of the character recognition of the segmented region samples by the trained model in the test are converged, the model training is ended, and the generated trained model is used as the trained predetermined recognition model.

In this embodiment, the regions which may not be recognized by the OCR engine are recognized by the trained LSTM model. As a model which is trained by a large number of segmented region samples and may converge the errors of the character recognition of the segmented region samples, the LSTM model may recognize the characters in the segmented regions more accurately by using long-term information, such as context information, which is memorized by itself in cooperation with its own long-term memory function during recognition the characters in the segmented regions, thereby further improving the recognition precision for the characters in the claim document.

A device of recognizing characters of a claim document is further provided.

Figure 3:
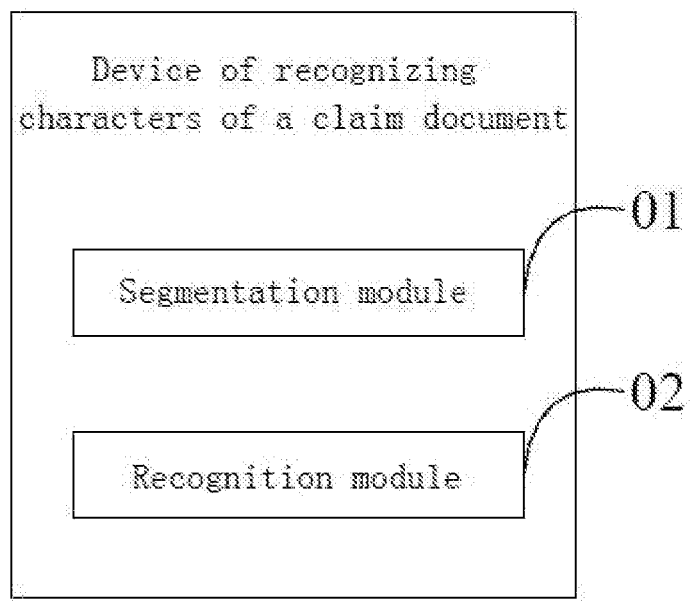
FIG. 3 is a schematic diagram of a functional module of a first embodiment of a device of recognizing characters of a claim document of the disclosure.

With reference to FIG. 3, it is a schematic diagram of a functional module of a first embodiment of a device of recognizing characters of a claim document of the disclosure.

In the first embodiment, the device of recognizing the characters of the claim document includes:

a segmentation module 01, which is used for performing region segmentation according to the frame line layout of a claim document frame format after receiving a claim document image to be subjected to character recognition, thus obtaining one or multiple segmented regions;

in this embodiment, the server may receive a character recognition request which is sent by a user and includes the claim document image to be subjected to character recognition. For example, it may receive the character recognition request sent by the user through a terminal such as a mobile phone, a flat computer and a self-service terminal. For example, it may receive the character recognition request sent by the user from a client pre-installed in the terminal such as the mobile phone, the flat computer and the self-service terminal, or receive the character recognition request sent by the user from a browser system in the terminal such as the mobile phone, the flat computer and the self-service terminal.

After the server receives the claim document image to be subjected to character recognition, the region segmentation is performed according to the frame line layout of the claim document frame format. In the claim document image, transverse or vertical frame lines are arrayed according to its frame format so as to form various input fields that the user can fill in relevant information. In this embodiment, the region segmentation is performed according to the frame line layout of the claim document frame format, so that one or more multiple segmented regions are obtained. For example, in one implementation mode, as different types of insurances generally correspond to different document format templates, a corresponding document template may be pre-obtained according to a document type (it is possible that different insurances have different document formats) uploaded by the user, and then the segmentation is performed according to the format of the template. Therefore, a document template corresponding to the claim document image may be found according to the document type of the received claim document image to be subjected to character recognition, and then the region segmentation is performed according to the corresponding document template. The segmented regions are regions having minimum areas, which are surrounded by the frame lines of the claim document frame format and do not include the frame lines, to avoid the interference and the influence of the frame lines on the recognition precision during subsequent character recognition of each segmented region. Each segmented region is similar to each square of an excel sheet, and each square of the excel sheet is the minimum region which does not include the frame lines.

A recognition module 02, which is used for calling a predetermined analysis model to analyze all the obtained segmented regions, and performing character recognition on all the analyzed segmented regions respectively by using a predetermined recognition rule to recognize the characters in all the segmented regions.

After one or multiple segmented regions are obtained by performing the region segmentation on the claim document image according to the frame line layout of the claim document frame format, the predetermined analysis model is called to analyze all the obtained segmented regions, and the character recognition is performed on all the segmented regions respectively by using the predetermined recognition rule to recognize the characters in all the segmented regions, namely the characters in the claim document image. For example, the predetermined analysis model may be used for analyzing recognition models or recognition methods applicable to all the segmented regions, and then the character recognition is performed on all the segmented regions by using the recognition models or the recognition methods applicable to all the segmented regions according to analysis results so as to improve the accuracy of the character recognition. For different segmented regions, it can be analyzed that a character recognition method is to perform the recognition by using an optical character recognition engine, and also by using other recognition engines or trained recognition models, and there is no limitation. After being recognized, the characters in all the segmented regions also may be automatically filled or typed into the corresponding input fields of an electronic claim document corresponding to the claim document image.

In this embodiment, before the character recognition for the claim document image, the claim document image is subjected to region segmentation according to the frame line layout of the claim document frame format, and then the character recognition is performed on all the segmented regions of the claim document respectively by using the predetermined recognition rule so as to respectively recognize the characters in all the segmented regions. In consideration of the influence of the claim document frame format on the recognition precision, the region segmentation is firstly performed according to the frame line layout of the claim document frame format before the character recognition, and then the character recognition is performed on all the segmented regions, so that the influence and the interference of the frame lines in the document on the character recognition during uniform recognition of the characters in the whole claim document image are avoided, and the recognition precision for the characters in the claim document can be effectively improved.

On the basis of the above-mentioned embodiment, the recognition module 02 is further used for:

calling a predetermined analysis model analyze all the obtained segmented regions so as to obtain first segmented regions which may be recognized by an optical character recognition engine and second segmented regions which may not be recognized by the optical character recognition engine;

performing character recognition on all the first segmented regions by using the predetermined optical character recognition engine to recognize characters in all the first segmented regions, and calling a predetermined recognition model to perform the character recognition on all the second segmented regions to recognize characters in all the second segmented regions.

In this embodiment, after one or multiple segmented regions are obtained by performing the region segmentation according to the frame line layout of the claim document frame format, before the obtained segmented regions are recognized, the predetermined analysis model is further called to analyze all the obtained segmented regions so as to obtain the first segmented regions which need no deep recognition and the second segmented regions which need the deep recognition. For example, a description will be made by taking a current own recognition engine which is an OCR (Optical Character Recognition) engine as an example. Regions which may be correctly recognized by the OCR engine or are high in recognition rate are used as the regions which need no deep recognition, that is to say, the current own OCR engine may correctly recognize characters in these regions without the assistance of other recognition methods. Regions which may not be recognized by the OCR engine or are low in recognition rate are used as the regions which need the deep recognition, that is to say, the current own OCR engine may not correctly recognize the characters in these regions, and the character recognition is performed by means of other recognition methods such as a trained recognition model.

After the first segmented regions which may be correctly recognized by the OCR engine and the second segmented regions which may not be recognized by the OCR engine in the claim document image are obtained by analysis, the character recognition may be performed on the first segmented regions and the second segmented regions which are obtained by analysis by taking different recognition methods. The character recognition is performed on all the first segmented regions by using the predetermined OCR engine so as to correctly recognize the characters in all the first segmented regions. The character recognition is performed on all the second segmented regions by calling the predetermined recognition model so as to correctly recognize the characters in all the second segmented regions. The predetermined recognition model may be a recognition model trained for a large number of segmented region samples, and also may be a recognition engine which is more complicated and has a better recognition effect than the recognition method of the own OCR engine, and there is no limitation.

Further, in other embodiments, the predetermined analysis model is a CNN (Convolutional Neural Network) model, and its training process is as follows:

A. for a predetermined claim document frame format, a preset number (for example, 500,000) of claim document image samples based on the claim document frame format are obtained;

B. region segmentation is performed on each claim document image sample according to the frame line layout of the claim document frame format, and third segmented regions misrecognized by the OCR engine and fourth segmented regions correctly recognized by the OCR engine in all the claim document image samples are determined;

C. all the third segmented regions are classified into a first training set, and all the fourth segmented regions are classified into a second training set;

D. a first preset ratio (for example, 80 percent) of segmented regions are extracted from the first training set and the second training set respectively as segmented regions for training, and the residual segmented regions in the first training set and the second training set are used as segmented regions for verification;

E. model training is performed by using all the extracted segmented regions for training so as to generate the predetermined analysis model, and the generated predetermined analysis model is verified by using all the segmented regions for verification;

F. if the verification pass rate is greater than or equal to a preset threshold value (for example, 98 percent), the training is completed, or if the verification pass rate is less than the preset threshold value, the number of claim document image samples is increased, and the steps A, B, C, D and E are repeatedly executed till the verification pass rate is greater than or equal to the preset threshold value.

In this embodiment, the segmented regions are analyzed by using the CNN model trained by a large number of claim document image samples, so that the first segmented regions which may be correctly recognized by the OCR engine and the second segmented regions which may not be correctly recognized by the OCR engine in all the segmented regions of the claim document may be accurately obtained by the analysis, and the subsequent accurate character recognition operation may be performed on the first segmented regions and the second segmented regions by respectively adopting different recognition methods, thereby improving the recognition precision for the characters in the claim document.

Further, in other embodiments, the predetermined recognition model is an LSTM (Long Short-Term Memory) model, and its training process is as follows:

a preset number (for example, 100,000) of region samples are obtained, which may be segmented region samples obtained by performing the region segmentation on a plurality of claim documents based on the frame line layouts of their frame formats in historical data. In one implementation mode, the type faces in the segmented region samples may be uniformly set into black, and the backgrounds are set into white, thus facilitating the character recognition. All the segmented region samples are labeled, for example, each segmented region sample may be named by characters included in this segmented region sample so as to facilitate the labeling.

The preset number of segmented region samples are classified into a first data set and a second data set according to a preset ratio (for example, 8:2), the first data set is used as a training set, and the second data set is used as a test set, wherein the sample number ratio of the first data set is greater than or equal to that of the second data set.

The first data set is sent into an LSTM network for model training, and the model is tested by using the second data set every preset time (for example, every 30 minutes or every 1,000 iterations) so as to estimate the effect of the current trained model. For example, during test, the character recognition may be performed on the segmented region samples in the second data set by using the trained model, and character recognition results of the segmented region samples are compared with the labels of these segmented region samples by using the trained model so as to calculate errors between the character recognition results of the trained model and the labels of the segmented region samples. To be specific, during calculation of the errors, an edit distance may be used as a calculation standard, wherein the edit distance is also called a Levenshtein distance which indicates the smallest number of times of edit operation required by conversion from one character string into another character string. An allowable edit operation includes replacing one character by another character, inserting one character and deleting one character. Generally, if the edit distance is shorter, two strings are more similar. Therefore, when the edit distance is used as the calculation standard to calculate the errors between the character recognition results of the trained model and the labels of the segmented region samples, if the calculated errors are smaller, the character recognition results of the trained model are more similar to the labels of the segmented region samples; and on the contrary, if the calculated errors are larger, the character recognition results of the trained model are less similar to the labels of the segmented region samples.

As the labels of the segmented region samples are the names of these segmented region samples, namely the characters included in these segmented region samples, the calculated errors between the character recognition results of the trained model and the labels of the segmented region samples are errors between the character recognition results of the trained model and the characters included in the segmented region samples, and may reflect errors between characters recognized by the trained model and correct characters. The errors obtained by each test on the trained model by using the second data set are recorded, and the change tendency of the errors is analyzed. If it analyzes that the errors of the character recognition of the segmented region samples by the trained model in the test are diverged, training parameters such as an activation function, the number of LSTM layers and input and output variable dimensions are adjusted, and then the model is retrained, so that the errors of the character recognition of the segmented region samples by the trained model in the test may be converged. After it analyzes that the errors of the character recognition of the segmented region samples by the trained model in the test are converged, the model training is ended, and the generated trained model is used as the trained predetermined recognition model.

In this embodiment, the regions which may not be recognized by the OCR engine are recognized by the trained LSTM model. As a model which is trained by a large number of segmented region samples and may converge the errors of the character recognition of the segmented region samples, the LSTM model may recognize the characters in the segmented regions more accurately by using long-term information, such as context information, which is memorized by itself in cooperation with its own long-term memory function during recognition the characters in the segmented regions, thereby further improving the recognition precision for the characters in the claim document.

A server of recognizing characters of a claim document is further provided.

Figure 4:
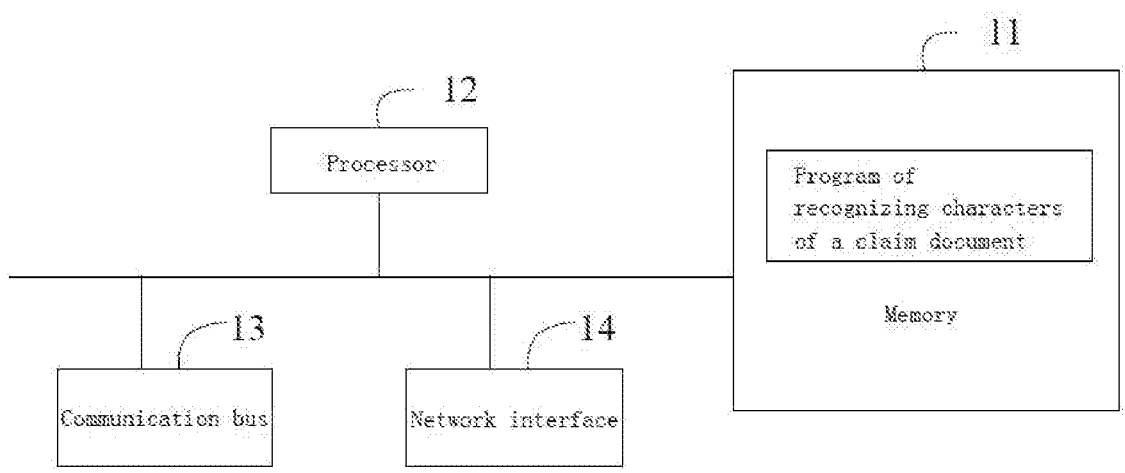
FIG. 4 is a schematic diagram of a first embodiment of a server of recognizing characters of a claim document of the disclosure.

With reference to FIG. 4, it is a schematic diagram of a first embodiment of a server of recognizing characters of a claim document of the disclosure.

In the first embodiment, the server of recognizing the characters of the claim document includes: a memory 11, a processor 12, a communication bus 13 and a network interface 14, wherein the communication bus 13 is used for realizing connection and communication among these assemblies.

The memory 11 includes an internal storage and at least one type of readable storage medium. The internal storage provides a buffer for operation of the server of recognizing the characters of the claim document. The readable storage medium may be a non-volatile storage medium such as a flash memory, a hard disk, a multimedia card and a card memory. In some embodiments, the readable storage medium may be an internal storage unit of the server of recognizing the characters of the claim document, for example, the hard disk or the internal storage of the server of recognizing the characters of the claim document. In some other embodiments, the readable storage medium also may be external storage equipment of the server of recognizing the characters of the claim document, for example, a pluggable hard disk equipped on the server of recognizing the characters of the claim document, an SMC (Smart Media Card), an SD (Secure Digital) card, a flash card, etc.

In this embodiment, the readable storage medium of the memory 11 may be generally used for not only storing application software installed in the server of recognizing the characters of the claim document and all types of data, for example a program of recognizing the characters of the claim document, but also temporarily storing data which have been already output or are about to output.

In some embodiments, the processor 12 may be a CPU (Central Processing Unit), a micro processing unit or other data processing chips, and is used for executing a program code stored in the memory 11 or processing the data.

The network interface 14 may include a standard wired interface and a wireless interface (for example, a WI-FI interface).

FIG. 4 only shows the server of recognizing characters of the claim document, which has the assemblies 11 to 14, but it should be understood that it does not require that all the shown assemblies are implemented, and to be substitutable, more or fewer assemblies are implemented.

Optionally, the server of recognizing the characters of the claim document also may include a user interface. The user interface may include a standard wired interface and a wireless interface, such as an input unit (a keyboard), a wired or wireless headphone port, an external power supply (or battery charger) port, a wired or wireless data port, a memory card port, a port for connecting a device having a recognition module, an audio input/output (I/O) port, a video I/O port and an earphone port. The user interface may be used for receiving an input (for example, data information and power) from an external device and transmitting the received input to one or multiple elements of a terminal.

Optionally, the server of recognizing the characters of a claim document also may include a display. The display may be an LED display, a liquid crystal display, a touch liquid crystal display and an OLED (Organic Light-Emitting Diode) touch device, etc., and is used for displaying information processed in the server of recognizing the characters of the claim document and displaying a visual user interface.

In the server embodiment of recognizing the characters of the claim document as shown in FIG. 4, the memory 11 may include the program of recognizing the characters of the claim document, and the processor 12 executes the program of recognizing the characters of the claim document, which is stored in the memory 11, to realize the following steps:

after receiving a claim document image to be subjected to character recognition, region segmentation is performed according to the frame line layout of a claim document frame format, thus obtaining one or multiple segmented regions;

a predetermined analysis model is called to analyze all the obtained segmented regions, and character recognition is performed on all the analyzed segmented regions respectively by using a predetermined recognition rule to recognize the characters in all the segmented regions.

Preferably, the step that a predetermined analysis model is called to analyze all the obtained segmented regions includes:

a predetermined analysis model is called to analyze all the obtained segmented regions so as to obtain first segmented regions which may be recognized by an optical character recognition engine and second segmented regions which may not be recognized by the optical character recognition engine;

the step that character recognition is performed on all the analyzed segmented regions by using the predetermined recognition rule also includes:

character recognition is performed on all the first segmented regions by using the predetermined optical character recognition engine to recognize characters in all the first segmented regions, and a predetermined recognition model is called to perform the character recognition on all the second segmented regions to recognize characters in all the second segmented regions.

Preferably, the predetermined analysis model is a convolutional neural network model, and its training process is as follows:

A. for a predetermined claim document frame format, a preset number of claim document image samples based on the claim document frame format are obtained;

B. region segmentation is performed on each claim document image sample according to the frame line layout of the claim document frame format, and third segmented regions misrecognized by an optical character recognition engine and fourth segmented regions correctly recognized by the optical character recognition engine in all the claim document image samples are determined;

C. all the third segmented regions are classified into a first training set, and all the fourth segmented regions are classified into a second training set;

D. a first preset ratio of segmented regions are extracted from the first training set and the second training set respectively as segmented regions for training, and the residual segmented regions in the first training set and the second training set are used as segmented regions for verification;

E. model training is performed by using all the extracted segmented regions for training so as to generate the predetermined analysis model, and the generated predetermined analysis model is verified by using all the segmented regions for verification;

F. if the verification pass rate is greater than or equal to a preset threshold value, the training is completed, or if the verification pass rate is less than the preset threshold value, the number of claim document image samples is increased, and the steps A, B, C, D and E are repeatedly executed till the verification pass rate is greater than or equal to the preset threshold value.

Preferably, the predetermined recognition model is an LSTM (Long Short-Term Memory) model, and its training process is as follows:

a preset number of segmented region samples are obtained, and all the segmented region samples are labeled by characters included in these segmented region samples;

the preset number of segmented region samples are classified into a first data set and a second data set according to a preset ratio, the first data set is used as a training set, and the second data set is used as a test set;

the first data set is sent into an LSTM network for model training, the character recognition is performed on the segmented region samples in the second data set by using the trained model every preset time, and recognized characters are compared with the labels of the segmented region samples so as to calculate errors between the recognized characters and the labels;

if the errors of the characters recognized by the trained model are diverged, preset training parameters are adjusted for retraining till the errors of the characters recognized by the trained model may be converged;

if the errors of the characters recognized by the trained model are converged, the model training is ended, and the generated model is used as the trained predetermined recognition model.

Preferably, the segmented regions are regions having minimum areas, which are surrounded by frame lines of the claim document frame format and do not include the frame lines.

The specific implementation mode of the server of recognizing the characters of the claim document of the disclosure is approximately the same as that of the abovementioned method of recognizing the characters of the claim document, so that no more details will be described.

A computer readable storage medium is further provided.

The computer readable storage medium stores a program of recognizing characters of a claim document. The program of recognizing the characters of the claim document is executed by at least one processor to realize the following steps:

after receiving a claim document image to be subjected to character recognition, region segmentation is performed according to the frame line layout of a claim document frame format, thus obtaining one or multiple segmented regions;

a predetermined analysis model is called to analyze all the obtained segmented regions, and character recognition is performed on all the analyzed segmented regions respectively by using a predetermined recognition rule to recognize the characters in all the segmented regions.

Preferably, the step that a predetermined analysis model is called to analyze all the obtained segmented regions includes:

a predetermined analysis model is called to analyze all the obtained segmented regions so as to obtain first segmented regions which may be recognized by an optical character recognition engine and second segmented regions which may not be recognized by the optical character recognition engine;

the step that character recognition is performed on all the analyzed segmented regions by using the predetermined recognition rule also includes:

character recognition is performed on all the first segmented regions by using the predetermined optical character recognition engine to recognize characters in all the first segmented regions, and a predetermined recognition model is called to perform the character recognition on all the second segmented regions to recognize characters in all the second segmented regions.

Preferably, the predetermined analysis model is a convolutional neural network model, and its training process is as follows:

A. for a predetermined claim document frame format, a preset number of claim document image samples based on the claim document frame format are obtained;

B. region segmentation is performed on each claim document image sample according to the frame line layout of the claim document frame format, and third segmented regions misrecognized by an optical character recognition engine and fourth segmented regions correctly recognized by the optical character recognition engine in all the claim document image samples are determined;

C. all the third segmented regions are classified into a first training set, and all the fourth segmented regions are classified into a second training set;

D. a first preset ratio of segmented regions are extracted from the first training set and the second training set respectively as segmented regions for training, and the residual segmented regions in the first training set and the second training set are used as segmented regions for verification;

E. model training is performed by using all the extracted segmented regions for training so as to generate the predetermined analysis model, and the generated predetermined analysis model is verified by using all the segmented regions for verification;

F. if the verification pass rate is greater than or equal to a preset threshold value, the training is completed, or if the verification pass rate is less than the preset threshold value, the number of claim document image samples is increased, and the steps A, B, C, D and E are repeatedly executed till the verification pass rate is greater than or equal to the preset threshold value.

Preferably, the predetermined recognition model is an LSTM (Long Short-Term Memory) model, and its training process is as follows:

a preset number of segmented region samples are obtained, and all the segmented region samples are labeled by characters included in these segmented region samples;

the preset number of segmented region samples are classified into a first data set and a second data set according to a preset ratio, the first data set is used as a training set, and the second data set is used as a test set;

the first data set is sent into an LSTM network for model training, the character recognition is performed on the segmented region samples in the second data set by using the trained model every preset time, and recognized characters are compared with the labels of the segmented region samples so as to calculate errors between the recognized characters and the labels;

if the errors of the characters recognized by the trained model are diverged, preset training parameters are adjusted for retraining till the errors of the characters recognized by the trained model may be converged;

if the errors of the characters recognized by the trained model are converged, the model training is ended, and the generated model is used as the trained predetermined recognition model.

Preferably, the segmented regions are regions having minimum areas, which are surrounded by frame lines of the claim document frame format and do not include the frame lines.

The specific implementation mode of the computer readable storage medium of the disclosure is approximately the same as that of the above-mentioned method of recognizing the characters of the claim document, so that no more details will be described.

It should be noted that in this text, terms "include" and "comprise" or any other variations aim at covering non-excludable including, so that processes, methods, objects or devices including a series of elements not only include those elements, but also include other elements which are not definitely listed, or also include fixed elements of these processes, methods, objects or devices. In the absence of more restrictions, an element defined by a sentence "including a/an . . . " does not exclude that the processes, methods, objects or devices including this element still include other same elements.

By the description of the foregoing implementation modes, it will be evident to those skilled in the art that the above-mentioned method may be implemented by means of software and a necessary general-purpose hardware platform; they may of course be implemented by hardware, but in many cases, the former will be more advantageous. Based on such an understanding, the essential technical solution of the disclosure, or the portion that contributes to the prior art may be embodied as software products. Computer software products can be stored in a storage medium (e.g., an ROM/RAM (Read Only Memory/Random Access Memory), a magnetic disk, an optical disc) and may include a plurality of instructions that can enable a set of terminal equipment (e.g., a mobile phone, a computer, a server, an air conditioner, network equipment) to execute the methods described in the various embodiments of the disclosure.

The foregoing accompanying drawings describe exemplary embodiments of the disclosure, and therefore are not intended as limiting the patentable scope of the disclosure. The foregoing numbering of the embodiments of the disclosure is merely descriptive, but is not indicative of the advantages and disadvantages of these embodiments. In addition, although a logic sequence is shown in the flowchart, the steps shown or described may be executed in a sequence different from this logic sequence in some cases.

Those skilled in the art can make various transformation solutions to implement the disclosure without departing from the scope and essence of the disclosure, for example, features of one embodiment may be used in another embodiment to obtain another embodiment. Any modifications, equivalent replacements and improvements that are made taking advantage of the technical conception of the disclosure shall all fall in the patentable scope of the disclosure.

What is claimed is:

1. A method of recognizing characters of a claim document, comprising:
   after a server receives a claim document image to be subjected to a character recognition, performing a region segmentation according to a frame line layout of a claim document frame format, thus obtaining one or multiple segmented regions;
   calling a predetermined analysis model to analyze all the obtained segmented regions, and performing the character recognition on all the analyzed segmented regions respectively by using a predetermined recognition rule to recognize characters in all the segmented regions;
   wherein the step of calling the predetermined analysis model to analyze all the obtained segmented regions comprises:
   calling the predetermined analysis model to analyze all the obtained segmented regions so as to obtain first segmented regions which are recognized by an optical character recognition engine and second segmented regions which are not recognized by the optical character recognition engine;
   wherein the step of performing the character recognition on all the analyzed segmented regions by using the predetermined recognition rule comprises:
   performing the character recognition on all the first segmented regions by using the predetermined optical character recognition engine to recognize characters in all the first segmented regions, and calling a predetermined recognition model to perform the character recognition on all the second segmented regions to recognize characters in all the second segmented regions;
   wherein the predetermined recognition model is an LSTM (Long Short-Term Memory) model, and a training process of the predetermined recognition model is as follows:
   obtaining a preset number of segmented region samples, and labeling all the segmented region samples by characters included in these segmented region samples;
   classifying the preset number of segmented region samples into a first data set and a second data set according to a preset ratio, taking the first data set as a training set, and taking the second data set as a test set;
   sending the first data set into an LSTM network for a model training, performing the character recognition on the segmented region samples in the second data set by using the trained model every preset time, and comparing recognized characters with labels of the segmented region samples so as to calculate errors between the recognized characters and the labels;
   if the errors of the characters recognized by the trained model are diverged, adjusting preset training parameters for retraining till the errors of the characters recognized by the trained model are converged;
   if the errors of the characters recognized by the trained model are converged, ending the model training, and taking the generated model as the trained predetermined recognition model.

2. The method of recognizing the characters of the claim document according to claim 1, wherein the predetermined analysis model is a convolutional neural network model, and a training process of the predetermined analysis model is as follows:
   A. for a predetermined claim document frame format, obtaining a preset number of claim document image samples based on the claim document frame format;
   B. performing the region segmentation on each claim document image sample according to the frame line layout of the claim document frame format, and determining third segmented regions misrecognized by the optical character recognition engine and fourth segmented regions correctly recognized by the optical character recognition engine in all the claim document image samples;
   C. classifying all the third segmented regions into a first training set, and classifying all the fourth segmented regions into a second training set;
   D. extracting a first preset ratio of the segmented regions from the first training set and the second training set respectively as segmented regions for training, and taking the residual segmented regions in the first training set and the second training set as segmented regions for verification;
   E. performing a model training by using all the extracted segmented regions for training so as to generate the predetermined analysis model, and verifying the generated predetermined analysis model by using all the segmented regions for verification;
   F. if a verification pass rate is greater than or equal to a preset threshold value, completing the training, or if the verification pass rate is less than the preset threshold value, increasing the number of claim document image samples, and repeatedly executing the steps A, B, C, D and E till the verification pass rate is greater than or equal to the preset threshold value.

3. The method of recognizing the characters of the claim document according to claim 1, wherein the segmented regions are regions having minimum areas, which are surrounded by frame lines of the claim document frame format and do not include the frame lines.

4. A server for recognizing characters of a claim document, comprising a memory and a processor, wherein the memory stores a program of recognizing the characters of the claim document, and the program of recognizing the characters of the claim document is executed by the processor to realize the following steps:
   after the server receives a claim document image to be subjected to a character recognition, performing a region segmentation according to a frame line layout of a claim document frame format, thus obtaining one or multiple segmented regions;
   calling a predetermined analysis model to analyze all the obtained segmented regions, and performing the character recognition on all the analyzed segmented regions respectively by using a predetermined recognition rule to recognize the characters in all the segmented regions;
   wherein the step of calling the predetermined analysis model to analyze all the obtained segmented regions comprises:

calling the predetermined analysis model to analyze all the obtained segmented regions so as to obtain first segmented regions which are recognized by an optical character recognition engine and second segmented regions which are not recognized by the optical character recognition engine;

wherein the step of performing the character recognition on all the analyzed segmented regions by using the predetermined recognition rule further comprises:

performing the character recognition on all the first segmented regions by using the predetermined optical character recognition engine to recognize characters in all the first segmented regions, and calling a predetermined recognition model to perform the character recognition on all the second segmented regions to recognize characters in all the second segmented regions;

wherein the predetermined recognition model is an LSTM (Long Short-Term Memory) model, and the training process of the predetermined recognition model is as follows:

obtaining a preset number of segmented region samples, and labeling all the segmented region samples by characters included in these segmented region samples;

classifying the preset number of segmented region samples into a first data set and a second data set according to a preset ratio, taking the first data set as a training set, and taking the second data set as a test set;

sending the first data set into an LSTM network for a model training, performing the character recognition on the segmented region samples in the second data set by using the trained model every preset time, and comparing recognized characters with labels of the segmented region samples so as to calculate errors between the recognized characters and the labels;

if the errors of the characters recognized by the trained model are diverged, adjusting preset training parameters for retraining till the errors of the characters recognized by the trained model are converged;

if the errors of the characters recognized by the trained model are converged, ending the model training, and taking the generated model as the trained predetermined recognition model.

5. The server for recognizing the characters of the claim document according to claim 4, wherein the predetermined analysis model is a convolutional neural network model, and a training process of the predetermined analysis model is as follows:

A. for a predetermined claim document frame format, obtaining a preset number of claim document image samples based on the claim document frame format;

B. performing the region segmentation on each claim document image sample according to the frame line layout of the claim document frame format, and determining third segmented regions misrecognized by the optical character recognition engine and fourth segmented regions correctly recognized by the optical character recognition engine in all the claim document image samples;

C. classifying all the third segmented regions into a first training set, and classifying all the fourth segmented regions into a second training set;

D. extracting a first preset ratio of the segmented regions from the first training set and the second training set respectively as segmented regions for training, and taking the residual segmented regions in the first training set and the second training set as segmented regions for verification;

E. performing a model training by using all the extracted segmented regions for training so as to generate the predetermined analysis model, and verifying the generated predetermined analysis model by using all the segmented regions for verification;

F. if a verification pass rate is greater than or equal to a preset threshold value, completing the training, or if the verification pass rate is less than the preset threshold value, increasing the number of claim document image samples, and repeatedly executing the steps A, B, C, D and E till the verification pass rate is greater than or equal to the preset threshold value.

6. The server for recognizing the characters of the claim document according to claim 4, wherein the segmented regions are regions having minimum areas, which are surrounded by frame lines of the claim document frame format and do not include the frame lines.

7. A non-transitory computer readable storage medium, wherein the computer readable storage medium stores a program of recognizing the characters of the claim document, and the program of recognizing the characters of the claim document is executed by at least one processor to realize the following steps:

after a server receives a claim document image to be subjected to a character recognition, performing a region segmentation according to a frame line layout of a claim document frame format, thus obtaining one or multiple segmented regions;

calling a predetermined analysis model to analyze all the obtained segmented regions, and performing the character recognition on all the analyzed segmented regions respectively by using a predetermined recognition rule to recognize the characters in all the segmented regions;

wherein the step of calling the predetermined analysis model to analyze all the obtained segmented regions comprises:

calling the predetermined analysis model to analyze all the obtained segmented regions so as to obtain first segmented regions which are recognized by an optical character recognition engine and second segmented regions which are not recognized by the optical character recognition engine;

wherein the step of performing character recognition on all the analyzed segmented regions by using the predetermined recognition rule further comprises:

performing the character recognition on all the first segmented regions by using the predetermined optical character recognition engine to recognize characters in all the first segmented regions, and calling a predetermined recognition model to perform the character recognition on all the second segmented regions to recognize characters in all the second segmented regions;

wherein the predetermined recognition model is an LSTM (Long Short-Term Memory) model, and the training process of the predetermined recognition model is as follows:

obtaining a preset number of segmented region samples, and labeling all the segmented region samples by characters included in these segmented region samples;

classifying the preset number of segmented region samples into a first data set and a second data set according to a preset ratio, taking the first data set as a training set, and taking the second data set as a test set;

sending the first data set into an LSTM network for a model training, performing the character recognition on the segmented region samples in the second data set by using the trained model every preset time, and comparing recognized characters with labels of the segmented region samples so as to calculate errors between the recognized characters and the labels;

if the errors of the characters recognized by the trained model are diverged, adjusting preset training parameters for retraining till the errors of the characters recognized by the trained model are converged;

if the errors of the characters recognized by the trained model are converged, ending the model training, and taking the generated model as the trained predetermined recognition model.

8. The non-transitory computer readable storage medium according to claim 7, wherein the predetermined analysis model is a convolutional neural network model, and a training process of the predetermined analysis model is as follows:

A. for a predetermined claim document frame format, obtaining a preset number of claim document image samples based on the claim document frame format;

B. performing the region segmentation on each claim document image sample according to the frame line layout of the claim document frame format, and determining third segmented regions misrecognized by the optical character recognition engine and fourth segmented regions correctly recognized by the optical character recognition engine in all the claim document image samples;

C. classifying all the third segmented regions into a first training set, and classifying all the fourth segmented regions into a second training set;

D. extracting a first preset ratio of segmented regions from the first training set and the second training set respectively as segmented regions for training, and taking the residual segmented regions in the first training set and the second training set as segmented regions for verification;

E. performing a model training by using all the extracted segmented regions for training so as to generate the predetermined analysis model, and verifying the generated predetermined analysis model by using all the segmented regions for verification;

F. if a verification pass rate is greater than or equal to a preset threshold value, completing the training, or if the verification pass rate is less than the preset threshold value, increasing the number of claim document image samples, and repeatedly executing the steps A, B, C, D and E till the verification pass rate is greater than or equal to the preset threshold value.

9. The non-transitory computer readable storage medium according to claim 7, which is characterized in that the segmented regions are regions having minimum areas, which are surrounded by frame lines of the claim document frame format and do not include the frame lines.

* * * * *